US011263197B2

United States Patent
Liu et al.

(10) Patent No.: US 11,263,197 B2
(45) Date of Patent: Mar. 1, 2022

(54) CONCURRENCY CONTROL METHOD OF DATABASE TRANSACTION COMBINING OPTIMISTIC LOCK AND PESSIMISTIC LOCK

(71) Applicant: Guizhou Esgyn Information Technology Co., Ltd., Guiyang (CN)

(72) Inventors: Ming Liu, Guiyang (CN); Guowu Chen, Guiyang (CN); Fangling He, Guiyang (CN)

(73) Assignee: GUIZHOU ESGYN INFORMATION TECHNOLOGY CO., LTD., Guiyang (CN)

( * ) Notice: Subject to any disclaimer, the term of this patent is extended or adjusted under 35 U.S.C. 154(b) by 24 days.

(21) Appl. No.: 17/033,894

(22) Filed: Sep. 27, 2020

(65) Prior Publication Data

US 2022/0012225 A1 Jan. 13, 2022

(30) Foreign Application Priority Data

Jul. 8, 2020 (CN) .......................... 202010651448.5

(51) Int. Cl.
*G06F 16/00* (2019.01)
*G06F 16/23* (2019.01)
*G06F 16/22* (2019.01)

(52) U.S. Cl.
CPC ...... *G06F 16/2343* (2019.01); *G06F 16/2282* (2019.01); *G06F 16/2315* (2019.01); *G06F 16/2365* (2019.01)

(58) Field of Classification Search
CPC ............. G06F 16/2343; G06F 16/2282; G06F 16/2315; G06F 16/2365
See application file for complete search history.

(56) References Cited

U.S. PATENT DOCUMENTS

| 6,952,829 | B1* | 10/2005 | Banavar | ............. H04L 67/1095 |
| | | | | 709/224 |
| 2008/0281839 | A1* | 11/2008 | Bevan | ..................... G06F 16/29 |
| 2008/0319997 | A1* | 12/2008 | Duffy | ..................... G06F 9/467 |
| 2014/0156953 | A1* | 6/2014 | Adl-Tabatabai | .... G06F 16/2315 |
| | | | | 711/147 |
| 2016/0314001 | A1* | 10/2016 | Forsell | .................. G06F 9/3867 |
| 2017/0269960 | A1* | 9/2017 | Diestelhorst | .......... G06F 9/3842 |

* cited by examiner

*Primary Examiner* — Syed H Hasan
(74) *Attorney, Agent, or Firm* — Bayramoglu Law Offices LLC

(57) ABSTRACT

A concurrency control method of database transaction combining an optimistic lock and a pessimistic lock includes: integrating a lock in each fragment in a storage range, using a lock table globally, and recording a lock status of the each fragment in the lock table; before reading a data object of a fragment in the storage range, first querying in the lock table whether the data object of the fragment is locked by other reading-writing transactions; if the data object of the fragment is locked by other reading-writing transactions, blocking the current reading operation, and repeating the current reading operation, and if the current reading operation is blocked for more than a given time limit, since the pessimistic lock is invalid, intervening by the optimistic lock, and continuing reading the single row data of the current fragment.

7 Claims, 1 Drawing Sheet

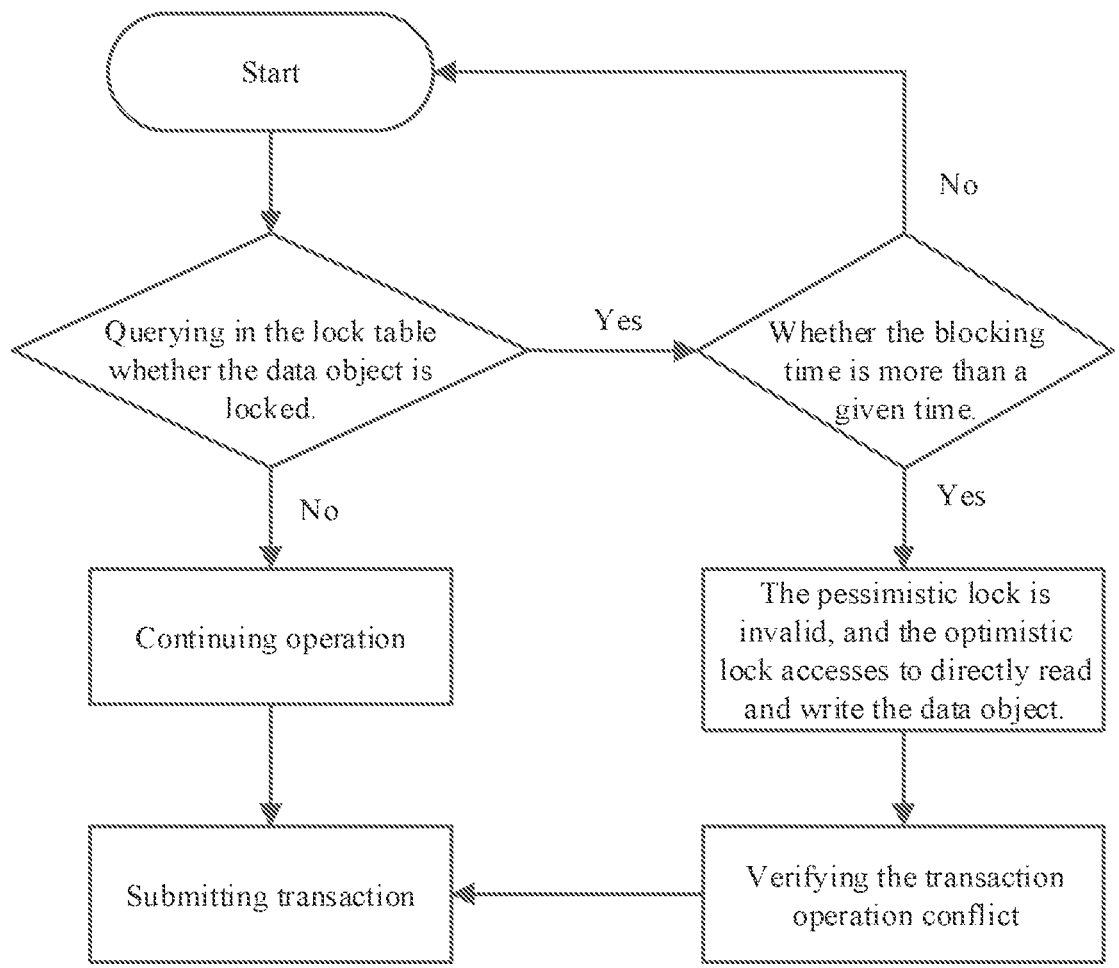

CONCURRENCY CONTROL METHOD OF DATABASE TRANSACTION COMBINING OPTIMISTIC LOCK AND PESSIMISTIC LOCK

CROSS REFERENCE TO THE RELATED APPLICATIONS

This application is based upon and claims priority to Chinese Patent Application No. 202010651448.5, filed on Jul. 8, 2020, the entire contents of which are incorporated herein by reference.

TECHNICAL FIELD

The present invention relates to a method for controlling database reading and writing, and more particularly, to a concurrency control method of database transaction combining an optimistic lock and a pessimistic lock.

BACKGROUND

To prevent data reading-writing conflicts in a database application, the semantics of a pessimistic lock and an optimistic lock are often used to control the reading and writing. Generally, the mechanism of database locking is realized based on the pessimistic lock mechanism, which can completely guarantee the exclusivity and correctness of the data. Each request first locks the data, then performs an operation on the data, and finally unlocks. The processes of locking and unlocking, however, consumes memory, so the performance is not optimal. The optimistic lock is a concurrent lock. The optimistic lock does not lock the data per se, but realizes the function of locking through transaction. Not locking the data means that a plurality of requests are allowed to access the data simultaneously, and meanwhile, the processes of locking and unlocking the data are omitted, thereby effectively improving the performance. However, since the conflict determination is processed centrally after the data are submitted, it is easy to get stuck in the submission of mass data processing requests. Additionally, the pessimistic lock and the optimistic lock are mutually exclusive concurrency control technologies. The database with the pessimistic lock cannot use the optimistic lock mechanism simultaneously, and vice versa. The concurrency and performance of the pessimistic lock are not as good as the optimistic lock in most application scenarios with low probability of concurrent conflict. The performance of the optimistic lock is less than optimal in application scenarios with high probability of concurrent conflict. Therefore, it is desirable to further research and improve the reading-writing control method used in the database.

SUMMARY

In order to solve the above shortcomings, an objective of the present invention is to provide a concurrency control method of database transaction combining an optimistic lock and a pessimistic lock, so as to solve the technical problems in the prior art that the pessimistic lock and the optimistic lock are mutually exclusive in the database, and both of them have different disadvantages in applications.

In order to solve the above technical problem, the present invention adopts the following technical solution.

The present invention provides a concurrency control method of database transaction combining an optimistic lock and a pessimistic lock, and the method includes the following steps:

step A: integrating a lock in each fragment in a storage range, using a lock table globally, and recording a lock status of the each fragment in the lock table;

step B: before reading a data object of a fragment in the storage range, first querying in the lock table whether the data object of the fragment is locked by other reading-writing transactions; if the data object of the fragment is not locked by other reading-writing transactions, continuing a reading operation, wherein no conflict checking is performed when a transaction is committed; if the data object of the fragment is locked by other reading-writing transactions, blocking a current reading operation, and repeating the current reading operation, and if the current reading operation is blocked for more than a given time limit, since the pessimistic lock is invalid, intervening by the optimistic lock, and continuing reading the data object of a current fragment; and step C: allowing a plurality of tasks to perform reading and writing operations to an identical object simultaneously by the optimistic lock, and verifying whether a conflict exists in data when the data are submitted.

Preferably, a further technical solution is: the storage range includes all or part of the data of the database.

A further technical solution is: the data object in step B includes single row data and a data range. The single row data are queried in the lock table through rowkey, and the data range is queried in the lock table through startKey and endKey.

A further technical solution is: if the rowkey or the range between the startKey and the endKey is occupied, returning TURN and waiting for the current reading operation to query in the lock table again.

A further technical solution is: the given time limit in step B is defaulted to be 1 second.

A further technical solution is: under the optimistic lock in the step B, verifying whether the conflict exists in the data when the data are submitted to determine whether a repeated reading operation or a repeated writing operation exists in two concurrent transactions.

A further technical solution is: the pessimistic lock in step B locks current data before a reading-writing transaction reads or writes the data until the pessimistic lock unlocks the current data, and then a next reading-writing transaction performs an operation on the current data.

Compared with the prior art, the present invention has the following advantages. The semantics of the pessimistic lock and the optimistic lock are combined in the concurrency control method of the database transaction. When the pessimistic lock and the optimistic lock coexist, the advantage of the pessimistic lock to prevent the conflict between reading and writing operations are not only retained, but also the transaction concurrency is maximized by switching the optimistic lock, thereby improving the performance. Moreover, the concurrency control method of database transaction combining the optimistic lock and the pessimistic lock of the present invention has simple program semantics, so it is suitable for use in various databases and has a wide application range.

BRIEF DESCRIPTION OF THE DRAWINGS

FIGURE is a logic flow chart for explaining an embodiment of the present invention.

DETAILED DESCRIPTION OF THE EMBODIMENTS

The specific embodiments of the present invention are further described below with reference to the drawing.

Firstly, the pessimistic lock and optimistic lock mentioned repeatedly in the specification are described as follows.

The pessimistic lock is based on a pessimistic attitude class to prevent all data conflicts. The pessimistic lock locks the data before modifying it, and then reads and writes the data. Before the pessimistic lock is unlocked, no one can perform operation on the data. Only when the previous reading-writing transaction unlocks the lock, can the next reading-writing transaction lock the data then read and write the data. Generally, the mechanism of database locking is realized based on the pessimistic lock mechanism. The characteristic of the pessimistic lock is that it can completely guarantee the exclusivity and correctness of the data because each request first locks the data, then performs an operation on the data, and finally unlocks it. The process of locking and unlocking consumes memory, so the performance is not optimal.

The way to manually add the pessimistic lock is as follows:

reading the lock: LOCK tables test_db read; unlocking the lock: UNLOCK TABLES; and writing the lock: LOCK tables test_db WRITE; unlocking the lock: UNLOCK TABLES.

Optimistic lock is to maintain an optimistic attitude with respect to data conflicts. When operating the data, the data to be operated will not be locked, which allows a plurality of tasks to perform operations on the data in parallel. Only when the data are submitted, a mechanism is used to verify whether the data conflicts, which is generally implemented by adding the version numbers and then comparing the version numbers. The characteristic of the optimistic lock is that the optimistic lock is a concurrent lock. The optimistic lock does not lock the data per se, but realizes the function of locking through transaction. Not locking the data means that a plurality of requests are allowed to access the data simultaneously, and meanwhile, the process of locking and unlocking the data are omitted. This way greatly improves the performance of data operation.

Based on the above description, as shown in FIGURE, an embodiment of the present invention is a concurrency control method of database transaction combining an optimistic lock and a pessimistic lock. In the method of the present invention, the for update lock is adopted as the pessimistic lock, which is essentially a reading lock. Based on this, the method of the present embodiment includes and preferably operates according to the following steps:

Step S1: a lock is integrated in each fragment in a storage range, a lock table is used globally, and a lock status of each fragment is recorded in the lock table. In this step, the storage range generally refers to all or part of the data of the database.

Step S2: before a data object of a fragment in the storage range is read, the data object of the fragment is first queried in the lock table whether to be locked by other reading-writing transactions; if the data object of the fragment is not locked by other reading-writing transactions, a reading operation continues, and no conflict checking is performed when the transaction is committed; if the data object of the fragment is locked by other reading-writing transactions, the current reading operation is blocked, and the current reading operation is repeated, and if the current reading operation is blocked for more than a given time limit, the pessimistic lock is invalid, and then the optimistic lock intervenes and continues reading the data object of the current fragment.

In the present embodiment, the semantics of the pessimistic lock and the optimistic lock are combined in the concurrency control method of the database transaction. When the pessimistic lock and the optimistic lock coexist, the advantage of the pessimistic lock to prevent the conflict between reading and writing operations are not only retained, but also the transaction concurrency is maximized by switching the optimistic lock, thereby improving the performance.

In step S2, the data object includes the single row data and the data range. The single row data are queried in the lock table through rowkey, and the data range is queried in the lock table through startKey and endKey. It is understandable that the method of the present embodiment can adopt a basically identical way, and the basically identical way is used to realize the reading of the single row data as the reading of the data range.

Specifically, the above method of reading rowkey in the single row data are as follows:

the lock table traverses all current lock information, and returns TRUE if the input rowkey is already occupied.

The determination algorithm is as follows:

```
FOR lock IN lockTable
    IF rowkey=lock.rowkey
        RETURN TRUE
    ELSE
        CONTINUE
RETURN FALSE
```

When the rowkey is locked, the current operation is blocked, and waits for a period of time to query the lock table again.

When the reading operation is blocked for more than the given time limit (the default time is 1 second), the query continues directly. At this time, the pessimistic lock is automatically abandoned, and the system protects the current transaction by the optimistic lock, and conflict checking is required when the transaction is committed.

In the same way, the above method of reading startKey and endKey in the data range is as follows:

the lock table traverses all current lock information, and returns TRUE if the input range is already occupied. The algorithm in which the range is occupied is as follows:

```
FOR lock IN lockTable
    IF      startKey>=lock.StartKey     AND
        endKey<=lock.EndKey
        RETURN TRUE
    ELSE
        CONTINUE
RETURN FALSE
```

When the scan range is locked, the current operation is blocked, and waits for a period of time to query the lock table again.

When the reading operation is blocked for more than the given time limit (the default time is 1 second), the query continues directly. At this time, the pessimistic lock is automatically abandoned, and the system protects the current transaction by the optimistic lock, and conflict checking is required when the transaction is committed.

If the reading operation acquires the lock within the timeout range, the reading operation continues, and this transaction acquires the range lock, and the optimistic lock is prohibited in this transaction. In this way, the transaction relies on the pessimistic lock to perform concurrency control, and when the transaction is committed, no conflict checking for the optimistic lock is performed.

On the other hand, as mentioned above, the optimistic lock allows a plurality of tasks to perform reading and writing operations on an identical object simultaneously, and verifies whether a conflict exists in data when the data are submitted. That is, under the optimistic lock, verifying whether the conflict exists in the data when the data are submitted is to determine whether a repeated reading operation or a repeated writing operation exists in two concurrent transactions. In the embodiment, the working flow of the optimistic lock is as follows.

In the process of reading and writing operations on the data, the optimistic lock records the reading and writing operations, but does not lock the reading and writing operations themselves. Therefore, a plurality of concurrent reading operations and writing operations can be performed simultaneously without blocking each other. When the transaction is submitted, the conflict check is performed according to the records. If reading operations or writing operations are repeated in two concurrent transactions, it is determined to be a conflict, including the following several specific situations:

reading and writing conflict: a conflict is determined in case that the reading operation of the transaction and the writing operation of other committed transactions are repeated;

writing and reading conflict: a conflict is determined in case that the writing operation of the transaction and the writing operation of other committed transactions are repeated; and reading and reading none-conflict: no conflict is determined in case that the reading operation of the transaction and the reading operation of other committed transactions are repeated.

Based on the above embodiment, in practical applications of the method described in the present invention, the optimistic lock can be completely relied on for concurrency control in low conflict business scenarios. In high conflict business scenarios, the for update lock is used as the pessimistic lock to perform control. Since the for update lock is only used and has an exclusiveness, the concurrency control can be completed in most scenarios. For special scenarios, the optimistic lock still performs control.

Scenario I: high conflict business scenario. All the transactions use the for update lock to perform concurrency control before performing the writing operation. In this case, the concurrency control is completely performed by the for update exclusive lock.

Scenario II: high conflict business scenario. Most transactions use the for update lock to perform concurrency control before performing the writing operation, but some transactions do not use the for update lock before performing the writing operation. When two transactions are concurrent, the for update lock cannot lock the concurrent transactions, and the optimistic lock is used to check the conflict. However, since the number of writing transactions that do not use the for update lock is relatively small, it still belongs in an optimistic scenario, and the optimistic lock is adopted to perform control to maximize the performance.

Scenario III: abnormal application may lead to residual lock. For example, after obtaining the lock, the process terminates abnormally and the lock is not unlocked in time. In this case, EsgynDB preempts and unlocks the for update lock within a specified time, and completely hands over the concurrency control to the optimistic lock for control, which ensures data consistency, and simply and effectively handles the problem of abnormal lock residue.

In addition to the above description, it should be noted that the expressions "an embodiment", "another embodiment", "embodiment", etc., refer to the specific features, structures, or features described in conjunction with the embodiment are included in at least one embodiment generally described in the present invention. An identical expression occurring in a plurality of places in the specification does not necessarily refer to the identical embodiment. Furthermore, when describing a specific feature, structure or characteristic in combination with any embodiment, what is claimed is that such characteristic, structure or characteristic implemented in combination with other embodiments shall fall within the scope of the present invention.

Although the present invention has been described with reference to a number of explanatory embodiments of the present invention, it should be understood that many other modifications and embodiments can be devised by those skilled in the art, and these modifications and embodiments shall fall within the scope and spirit of the principles of the present invention, More specifically, within the scope of the specification, drawings and claims of the present invention, various modifications and improvements can be made to the component parts and/or layout of theme combination layout in addition to the modification and improvement of the component parts and/or the layout, other uses are also obvious to those skilled in the art.

What is claimed is:

1. A concurrency control method of database transaction combining an optimistic lock and a pessimistic lock, comprising the following steps:

integrating a lock in each fragment in a storage range, using a lock table globally, and recording a lock status of the each fragment in the lock table;

before reading a data object of a fragment in the storage range, first querying in the lock table whether the data object of the fragment is locked by other reading-writing transactions; when the data object of the fragment is not locked by other reading-writing transactions, continuing a reading operation, wherein no conflict checking is performed when a transaction is committed; when the data object of the fragment is locked by other reading-writing transactions, blocking a current reading operation, and repeating the current reading operation, and when the current reading operation is blocked for more than a given time limit, and the pessimistic lock is invalid, intervening by the optimistic lock, and continuing reading the data object of a current fragment; and allowing a plurality of tasks to perform reading and writing operations to an identical object simultaneously by the optimistic lock, and verifying whether a conflict exists in data when the data are submitted.

2. The concurrency control method according to claim 1 wherein, the storage range comprises all or part of the data of the database.

3. The concurrency control method according to claim 1, wherein, the data object comprises single row data and a data range; the single row data are queried in the lock table through rowkey, and the data range is queried in the lock table through startKey and endKey.

4. The concurrency control method according to claim 3, wherein, when the rowkey or the data range between the startKey and the endKey is occupied, returning TURN and waiting for the current reading operation to query in the lock table again.

5. The concurrency control method according to claim 1, wherein, the given time limit is defaulted to be 1 second.

6. The concurrency control method according to claim 1, wherein, under the optimistic lock, verifying whether the conflict exists in the data when the data are submitted to determine whether a repeated reading operation or a repeated writing operation exists in two concurrent transactions.

7. The concurrency control method according to claim 1, wherein, the pessimistic lock locks current data before a reading-writing transaction reads or writes the data until the pessimistic lock unlocks the current data, and then a next reading-writing transaction performs an operation on the current data.

* * * * *